Aug. 7, 1934.   G. M. NELL   1,968,901
LUBRICATION OF FLUID PRESSURE TOOLS
Filed June 12, 1931   2 Sheets-Sheet 2
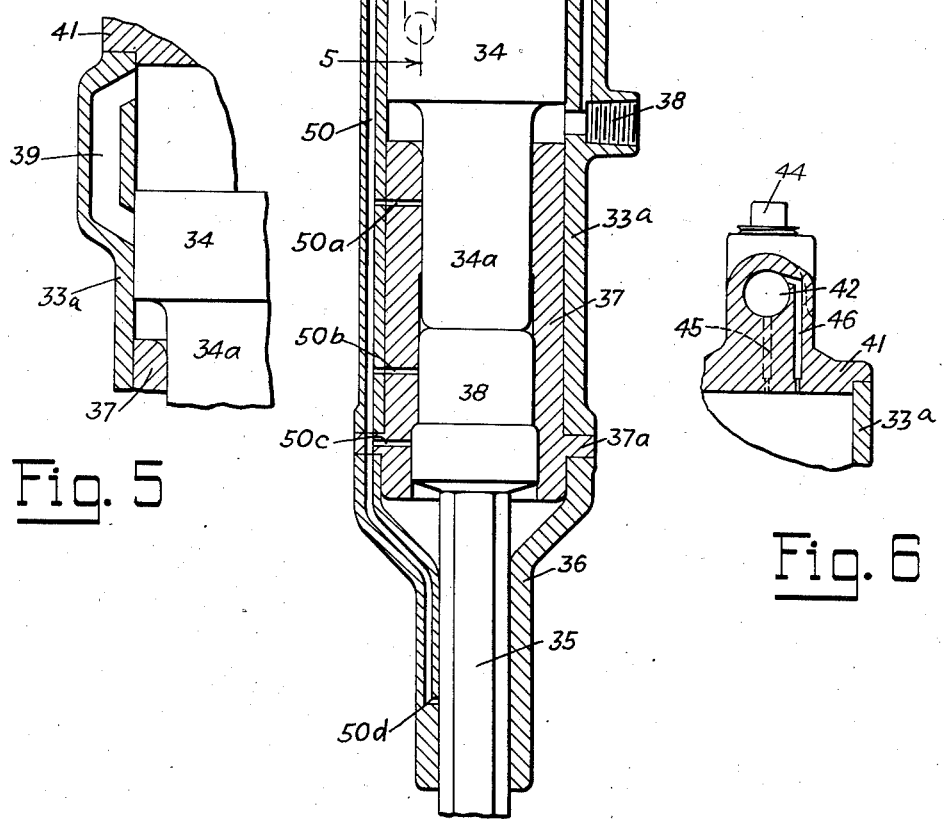
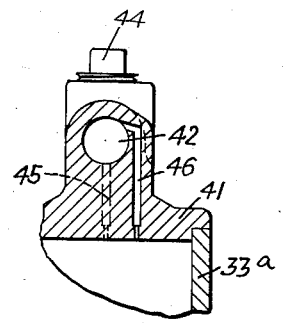
INVENTOR.
Gustave M. Nell
BY
Ira L. Nickerson
ATTORNEY.

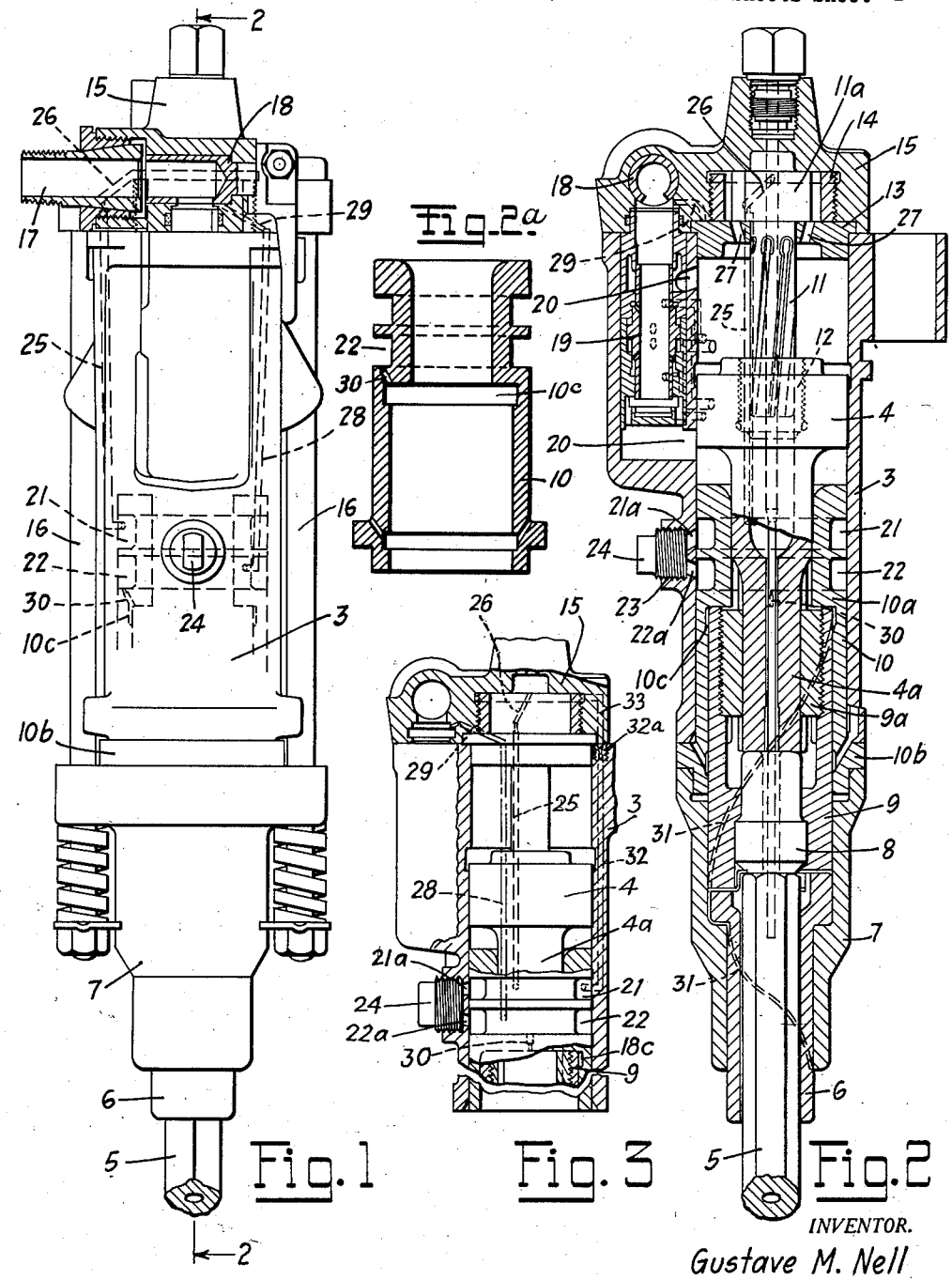

Patented Aug. 7, 1934

1,968,901

UNITED STATES PATENT OFFICE 1,968,901

LUBRICATION OF FLUID PRESSURE TOOLS

Gustave M. Nell, Detroit, Mich., assignor to Chicago Pneumatic Tool Company, New York, N. Y., a corporation of New Jersey Application June 12, 1931, Serial No. 543,842

7 Claims. (Cl. 121—13)

This invention relates to fluid pressure operated tools with particular reference to the lubrication thereof. It directly concerns pneumatic percussive tools, such as rock drills, which have always presented difficulties in relation to lubrication on account of the wide range of mean pressures obtaining at various points in such machines. This application is a continuation in part of my copending application Serial No. 216,828, filed September 1, 1927.

One object of the invention is to provide a simple but positive lubricating system for machines of the described type. Another object is to provide for the distribution of the lubricant to the high as well as to the low pressure parts of the machine. Another object is to avoid waste of lubricant when the tool is not running by venting the pressure from the lubricant chamber. Another object is to reduce to a minimum the places to be filled with lubricant by the operator of the machine. Other objects will be apparent from the detailed description which follows.

In order to illustrate the invention concrete embodiments thereof are shown in the accompanying drawings, in which:

Fig. 1 is a top plan view;

Fig. 2 is a longitudinal sectional view substantially on the line 2—2 of Fig. 1;

Fig. 2a is a sectional view of a bushing showing the lubricant chambers and passages therein;

Fig. 3 is a fragmentary sectional view indicating a slight variation in the connections to one of the lubricant chambers;

Fig. 4 is a longitudinal sectional view of a hand-supported drill showing a modification; and Figs. 5 and 6 are detail sectional views substantially on the lines 5—5 and 6—6 respectively of Fig. 4.

The embodiment of the invention shown in Figs. 1 and 2 comprises a rock drill of the drifter type having a cylinder 3 in which reciprocates a hammer piston 4 arranged to impart blows to a working tool or drill steel 5 mounted in a rotatable chuck 6 supported in front head 7. The piston may give its blow through an anvil block 8 which is supported in a rotatable guide sleeve 9 having keyed connection with chuck 6. Sleeve 9 has a bearing in a bushing 10 extending well within cylinder 3 and having a portion 10a serving as a guide for the fluted or ribbed extension 4a of the piston and also has a flange 10b which is clamped between cylinder 3 and front head 7. Rotatable sleeve 9 carries a bearing member 9a which is provided with grooves to receive the flutes or ribs of the piston extension 4a so that rotation of the piston may be imparted through member 9 to the drill chuck 6. Rotation may be imparted to the piston 4 by any suitable mechanism, that shown being the well known rifle bar 11 and nut 12. The rifle bar 11 has a bearing in cylinder ring 13, and the pawl head 11a with its cooperating ratchet ring 14 are mounted in the backhead 15 of the drill. The parts of the drill including cylinder 3, front head 7 and backhead 15 with the mechanism contained therein are maintained in assembled relation by the usual side bolts 16 (Fig. 1).

Motive fluid for operating the tool is arranged to be admitted through inlet connection 17, and is manually controlled by throttle valve 18. The percussive motor may be of any suitable or desired type, the motor herein shown being controlled by an automatic pressure operated valve 19.

By reason of ports 20 connecting the valve chamber with the piston chamber, the rear or upper portions of the tool may be considered as under relatively high pressure in that motive fluid from inlet 17 has access thereto, while the portions of the tool within bushing 10 and front head 7 communicate with atmosphere and ordinarily receive only the leakage pressure from the piston chamber. In order adequately and properly to lubricate both the high pressure and low pressure portions of the tool, separate lubricant chambers 21 and 22 are provided. One arrangement is to form cylinder bushing 10 with external grooves in the enlarged portion 10a so that lubricant chambers 21 and 22 are provided between the bushing and cylinder 3. These chambers are arranged to be filled in one operation through ports 21a and 22a connecting with the chambers and both communicating with a large port 23 which is closed by screw plug 24 which seals the two lubricant chambers from each other.

Chamber 21 has a single connection 25 extending axially of cylinder 3 and connecting with a passage 26 opening into the ratchet and pawl chamber for the rotation mechanism in the backhead, which chamber is in communication with the piston chamber through ports 27 so that lubricant in chamber 21 is subjected to the pulsating pressures of the motive fluid in the rear end of the piston chamber, the one connection serving both to admit pressure fluid to chamber 21 and to discharge spurts of lubricant therefrom into the ratchet and pawl chamber, whence the lubricant works down into the piston chamber of the motor and also through the connecting ports and passages of the valve chamber to lubricate valve 19.

The connections to lubricant chamber 22 comprise a passage 28 (Fig. 1) which communicates with a passage 29 in the backhead opening into the motive fluid inlet leading to valve 19 and a restricted outlet or discharge passage 30 extending from chamber 22 to an annular groove 10c in bushing 10 closely adjacent the upper end of bearing sleeve 9. A groove 31 (Fig. 2) extends from annular groove 10c and winds about the interior of bushing 10 and front head 7 until atmosphere is reached so as to provide a path for the lubricant and to make sure that the same reaches all the rotating parts of the front head. As indicated in Fig. 2 discharge opening 30 is disposed substantially at a central point vertically of chamber 22 when the tool is used as a drifter, with the result that the motive fluid admitted by passages 29, 28 to chamber 22 forces an immediate and steady discharge of lubricant into groove 10c until the level of the lubricant is lowered to outlet opening 30. Thereafter the lubricant passes out in less volume as the result of the churning and mixing of the lubricant with the motive fluid admitted by passage 28.

The form shown in Fig. 3 corresponds to the embodiment disclosed in Figs. 1 and 2 with the exception that lubricant chamber 21 has an additional passage 32 in the wall of cylinder 3 which communicates through a plug 32a forming a restriction with a passage 33 in back head 15 communicating with the ratchet and pawl chamber. Thus chamber 21 has two connections to the ratchet and pawl chamber but that provided by passages 25, 26 is toward the top of lubricant chamber 21 when the drill is in normal operating position while passage 32, 33 leads from the bottom of the chamber. So long as the lubricant level in chamber 21 is above passage 25, 26 lubricant will pulsate through both passages into the ratchet and pawl chamber but after it has fallen below the level of passage 25, 26 it will pulsate only through passage 32, 33 and the upper passage will promptly relieve the pressure in chamber 21 when the drill is shut down.

In Figs. 4 to 6, the invention is embodied in a sinker drill adapted to be supported manually in an upright position for driving vertical holes. It comprises a cylinder 33a within which reciprocates a piston 34 having an extension 34a imparting blows to drill steel 35 supported in front head 36. A cylinder bushing 37 provides a bearing for piston extension 34a and supports an anvil block 38 interposed between the piston and drill steel 35. Bushing 37 may have a flange 37a which is clamped between cylinder 33a and front head 36. The tool is of the valveless type with pressure fluid entering through an inlet opening 38 in the cylinder wall beneath piston head 34, whence it may be by-passed as the piston approaches the upper limit of its movement by a passage 39. An exhaust opening 40 through the cylinder wall relieves the pressure above the piston as the latter approaches the limit of its downward movement.

The rear end of cylinder 33a is closed by back head 41 providing aligned extensions or grip portions 41a and 41b to be grasped by the operator. These grip portions are hollow to provide separate lubricant chambers 42 and 43. Both chambers are filled in one operation through ports 42a and 43a which communicate with a single opening which is closed by a screw plug 44 which seals the two lubricant chambers from each other. Chamber 42 communicates with the rear end of the piston chamber by passages 45 and 46 both of which are restricted adjacent the piston chamber. By referring to Fig. 6, it will be observed that passage 46 enters lubricant chamber 42 near its highest point while passage 45 communicates with its lowest point. When the lubricant level falls below entrance to passage 46 it pulsates into the piston chamber in response to variations in pressure in the latter only through passage 45, but passage 46 then serves to release the pressure in the lubricant chamber which is built up before exhaust port 40 is uncovered by the piston. This slows up the egress of oil in chamber 42 and tends to conserve the lubricant. It also provides a means for quick release of compressed air from this chamber when the motive fluid supply to inlet 38 is shut off. Otherwise, practically all the lubricant would be forced out of chamber 42 into the piston chamber.

Lubricant chamber 43 has pressure fluid supplied thereto directly from inlet 38 by a passage 47 in cylinder 33a which communicates with passage 48 in backhead 41. This forces lubricant out through passage 49 which has a restriction communicating with axial passage 50 in cylinder 33 from which extend cross passages 50a, 50b, 50c and 50d for supplying lubricant to the moving parts of the drill in the low pressure portions of the same. Continuous movement of lubricant occurs until the lubricant level reaches that of the entrance to passage 48 after which its egress depends upon the up and down movement of the machine as a whole and the churning and foaming of the remaining lubricant.

From the above it will be apparent that the present invention provides separate and distinct lubricant chambers which are conveniently filled in one operation but sealed from one another thereafter; that these chambers are in communication respectively with the high and low pressure portions of the tool, that the chambers are adjacent to one another but may be remote from the parts to be lubricated; that the connections are such that the feeding of lubricant is accomplished in a manner adequately to lubricate all the moving parts of the tool, and that pressure accumulating in the chambers is vented when the tool is no longer in operation so as to prevent waste of lubricant.

While the invention has been herein disclosed in what are now considered to be preferred forms, it is to be understood that the invention is not limited to the specific details thereof but covers all changes, modifications and adaptations within the scope of the appended claims.

I claim as my invention:

1. In a fluid pressure operated machine having moving parts disposed in both high and low pressure portions thereof, means for supplying lubricant to said parts including separate lubricant chambers, one or more fluid passages for subjecting said chambers to different pressures, and means for filling said chambers at one operation and for sealing the same from one another and from atmosphere when filled.

2. A fluid pressure machine having moving parts disposed in both high and low pressure portions thereof, a plurality of lubricant chambers, a connection from one of said chambers to the high pressure portions of the machine for supplying lubricant thereto, a connection from another of said chambers to the low pressure portions of the machine for supplying lubricant to the latter, means for subjecting the first chamber to a higher pressure than the other chamber, means by which said chambers may be filled simultaneously at a single operation, and sealing means adapted to seal said chambers from each other and both from atmosphere, whereby to maintain differential pressures in said chambers during the operation of the machine.

3. In a fluid pressure operated percussive machine having a cylinder, front and back heads therefor, and moving parts disposed in both high and low pressure portions of the machine, means providing a plurality of lubricant chambers, connections from one of said chambers to the high pressure portions of the machine, connections from another of said chambers for moving lubricant under pressure to low pressure portions of the machine, said back head having a port therethrough for filling said chambers at one time, and a plug for closing said port and sealing said chambers from one another and both from atmosphere in a fluid-tight manner.

4. In combination in a fluid pressure percussive tool, a cylinder, a piston reciprocable therein, a bushing within said cylinder serving as a guide for said piston, said bushing providing separate lubricant chambers, means for subjecting said chambers to different pressures, said cylinder providing a port communicating with both said chambers to permit simultaneous filling of the same, and a plug for said port for sealing said chambers from one another and both from atmosphere.

5. In a fluid pressure tool having a plurality of lubricant chambers, means providing for filling of said chambers in one operation, means for sealing said chambers from one another, means providing for egress from one of said chambers to a relatively low pressure portion of the tool and from the other chamber to a relatively high pressure portion of the tool, and means for effecting rapid movement of lubricant at first and for decreasing the movement after a given time.

6. The combination of a rock drill having a front head and a back head, aligned extensions on said back head forming grips for manually supporting the drill, said grips being hollow and providing separate lubricant chambers, means intermediate said chambers for filling the same in one operation and for sealing them from one another thereafter, one of said chambers having connections from vertically spaced portions thereof to the rear end of the cylinder, and the other of said chambers having a connection to a source of pressure fluid and another connection to the low pressure portions of said drill in and adjacent said front head.

7. The combination of a rock drill having a front head and a back head, aligned extensions on said back head forming grips for manually supporting the drill, said grips being hollow and providing separate lubricant chambers, means intermediate said chambers for filling the same in one operation and for sealing them from one another thereafter, one of said chambers having connections from vertically spaced portions thereof to the rear end of the cylinder, and the other of said chambers having a connection to a source of pressure fluid and another connection to the low pressure portions of said drill in and adjacent said front head, said last-named connection being from a point intermediate the top and bottom of said chamber.

GUSTAVE M. NELL.